United States Patent
Lin et al.

(10) Patent No.: US 7,282,831 B2
(45) Date of Patent: Oct. 16, 2007

(54) GENERATOR IN A WHEEL OF A BICYCLE WITH COLLECTIVE MULTIPLE MAGNETIC POLES

(75) Inventors: Yi-Yin Lin, Daya Township, Taichung County (TW); Hubert Chen, No. 269, Sec. 3, Minsheng Rd., Daya Township, Taichung County 428 (TW); Kuei-Tang Liao, No. 1-48, Cingcyuan Rd., Daya Township, Taichung County 428 (TW)

(73) Assignees: Hubert Chen (TW); Kuei-Tang Liao (TW)

( * ) Notice: Subject to any disclaimer, the term of this patent is extended or adjusted under 35 U.S.C. 154(b) by 20 days.

(21) Appl. No.: 11/158,042

(22) Filed: Jun. 22, 2005

(65) Prior Publication Data

US 2006/0290229 A1    Dec. 28, 2006

(51) Int. Cl.
    *H02K 1/00*     (2006.01)
    *H02K 3/04*     (2006.01)
    *H02K 27/02*    (2006.01)
(52) U.S. Cl. ............... 310/218; 310/75 C; 310/206
(58) Field of Classification Search ............ 310/217, 310/218, 254, 75 C, 42, 91, 203, 206, 208
See application file for complete search history.

(56) References Cited

U.S. PATENT DOCUMENTS

| | | | | |
|---|---|---|---|---|
| 1,355,347 A | * | 10/1920 | Mortensen | ............ 310/218 |
| 1,369,765 A | * | 3/1921 | Alexander | ............ 310/218 |
| 2,607,816 A | * | 8/1952 | Ryder et al. | ............ 310/42 |
| 2,913,603 A | * | 11/1959 | Carlson | ............ 310/42 |
| 3,914,859 A | * | 10/1975 | Pierson | ............ 29/596 |
| 4,321,958 A | * | 3/1982 | Delassus | ............ 164/468 |
| 4,665,331 A | * | 5/1987 | Sudo et al. | ............ 310/68 R |
| 4,673,834 A | * | 6/1987 | Wrobel | ............ 310/71 |
| 6,093,985 A | * | 7/2000 | Chen | ............ 310/67 A |
| 6,573,632 B2 | * | 6/2003 | Hsu | ............ 310/216 |

FOREIGN PATENT DOCUMENTS

JP     2001204150 A   *  7/2001     ........... 310/217

* cited by examiner

*Primary Examiner*—Tran Nguyen
(74) *Attorney, Agent, or Firm*—Ming Show; Sinorica, LLC

(57) ABSTRACT

A small generator with collective multiple magnetic poles includes a magnet, multiple magnetic poles arranged in an annular shape and facing to the magnet, an annular iron core having its outer circumference combined with the multiple magnetic poles spaced apart and equidistantly. The iron core forms magnetic circuits for the magnetic poles so as to let magnetic lines of force to pass through. A sheet-shaped coil is combined on each magnetic pole so that when the magnet is rotated around the iron core with the magnetic poles, the sheet-shaped coil may generate alternate electric current. The sheet-shaped coils are quickly made by mechanical process, with magnetic wires requited for the coils reduced a lot.

7 Claims, 11 Drawing Sheets

GENERATOR IN A WHEEL OF A BICYCLE WITH COLLECTIVE MULTIPLE MAGNETIC POLES

BACKGROUND OF THE INVENTION

1. Field of the Invention

This invention relates to a generator in a wheel of a bicycle with collective multiple poles.

2. Description of the Prior Art

A conventional generator, especially applied to a wheel hub of a bicycle, is generally a nail-type magnetic-pole generator including a cylindrical member made of permanent magnet for which a wheel hub shell is used, and two stator yokes consisting of a disc and multiple nail-shaped poles extending from the disc in an annular form and facing to the permanent magnet. Further, an iron core is fixed on a hub shaft inside the cylindrical member for forming magnetic circuits to let magnetic line of force the stator yokes to pass through. A plate-shaped coil wound on a coil frame is provided around the iron core, so the hub shell and the cylindrical member (or the permanent magnet) constitute a rotor, and the two stator yokes, the iron core, the coil frame, the coil and the hub shaft constitute a stator. When the rotor of the hub shell is rotated by the spokes of the front or the rear wheel, the magnetic lines of force of the permanent magnet may be transmitted from the finger-shaped poles to the nail-shaped magnetic poles of the other stator yoke via the iron core, and alternate magnetic lines of force of different directions may be produced on the iron core, so the coils on the coil frame may produce electric current, which is to be supplied to electronic appliances on the bicycle.

However, the conventional generator with finger-shaped poles has the plate-shaped coil, which must be made manually, impossible to be made by mechanical process, so it is made very slowly, resulting in a high cost. In addition, magnetic wire volume required by the coil is also quite large, heightening its material cost. Besides, the electric power generated by the conventional generator may be not enough for electronic appliances on the bicycle.

SUMMARY OF THE INVENTION

The feature of the invention is a magnet and multiple magnetic poles arranged in a ring shape and facing to the magnet, a iron core having its outer circumference fitted with the multiple poles and functioning as magnetic circuits for magnetic lines of force of the multiple poles to pass through, and in addition, a sheet-shaped coil respectively fitted stably on each magnetic pole. Then when the magnet is rotated against the multiple poles on the iron core, the coil may produce electric current. As the foresaid coils can be made by mechanical process, needless to be made manually as the conventional one, they can be made easily and quickly, in addition to the magnetic wire required can be reduced a lot, cutting down the cost, and besides its electric power is also upgraded.

BRIEF DESCRIIPTION OF DRAWINGS

This invention will be better understood by referring to the accompanying drawings, wherein.

DETAILED DESCRIPTION OF THE PREFERRED EMBODIMENTS

Figure 1:
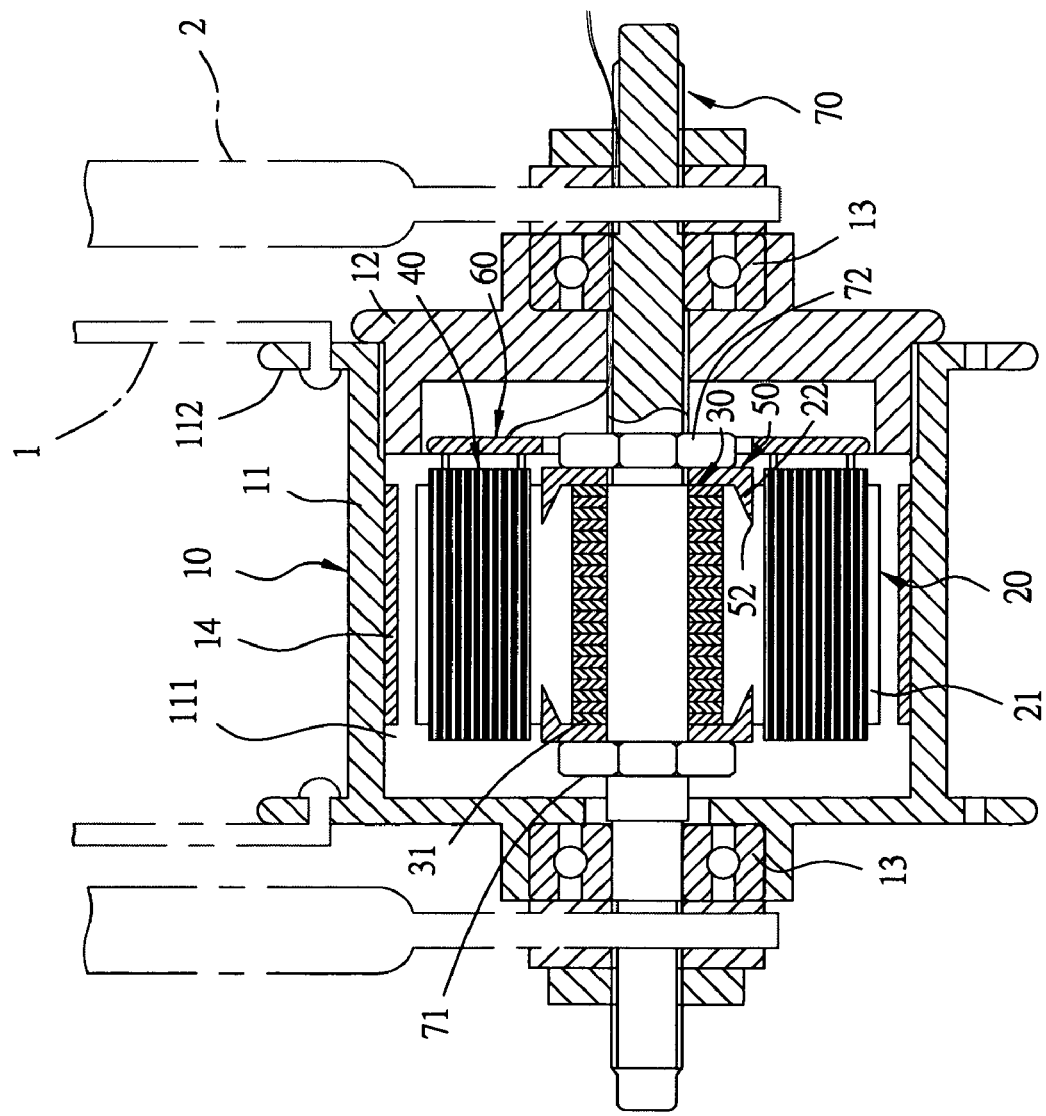
FIG. 1 is a side cross-sectional view of a first embodiment of a small generator with collective multiple poles applied to a wheel hub of a bicycle in the present invention.
Figure 2:
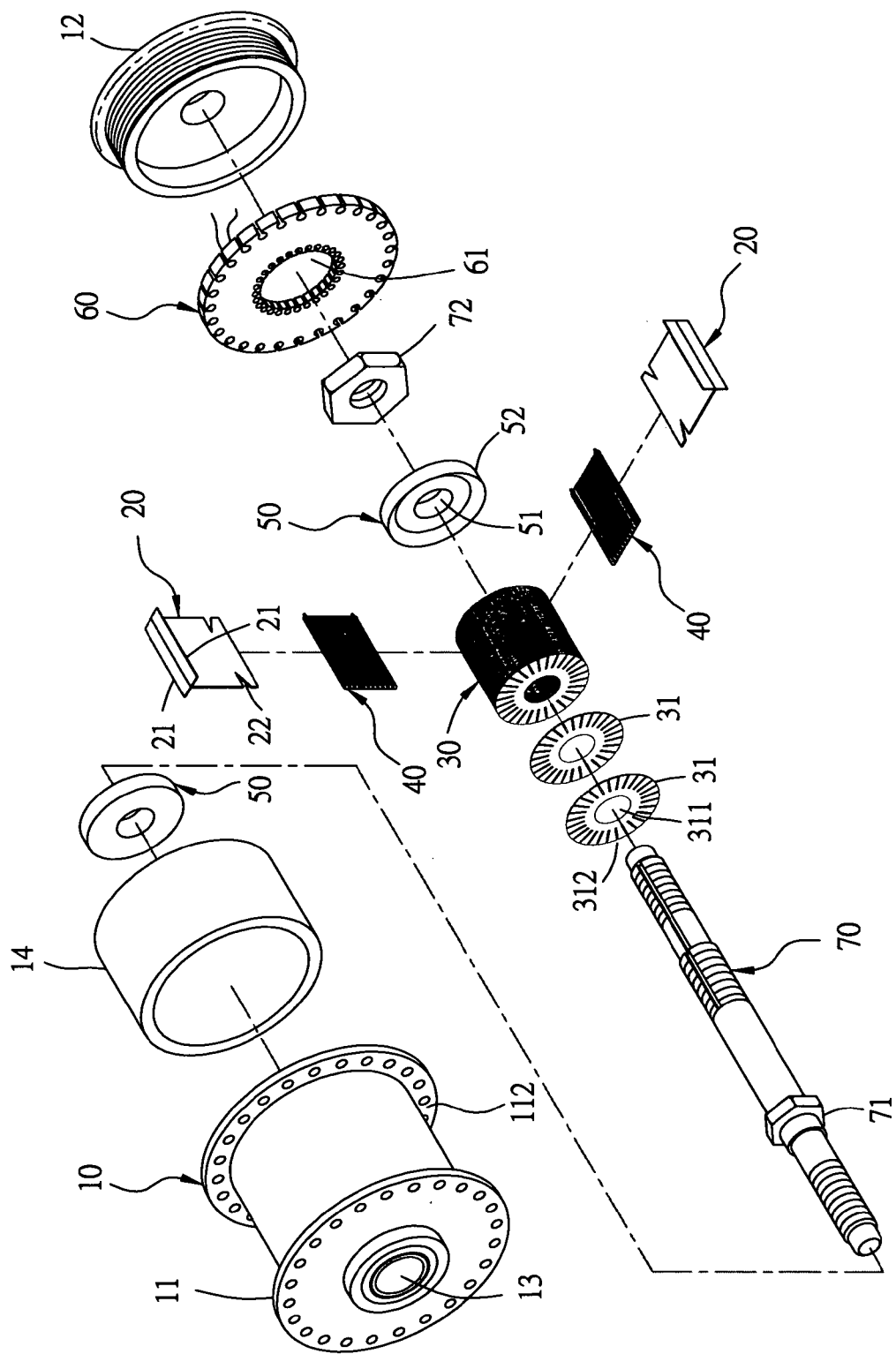
FIG. 2 is a partial exploded perspective view of the first embodiment of a small generator in the present invention.
Figure 3:
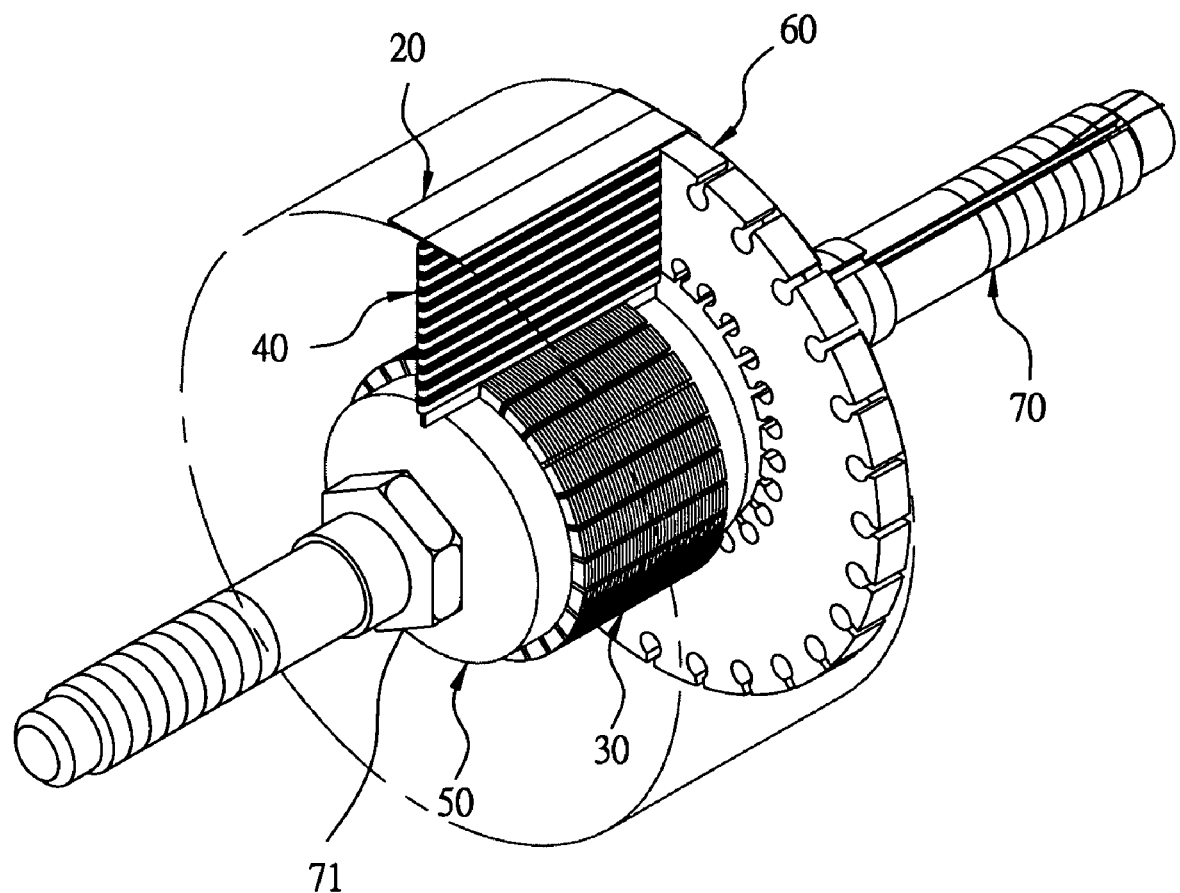
FIG. 3 is a partial perspective view of the first embodiment of a small generator in the present invention.
Figure 4:
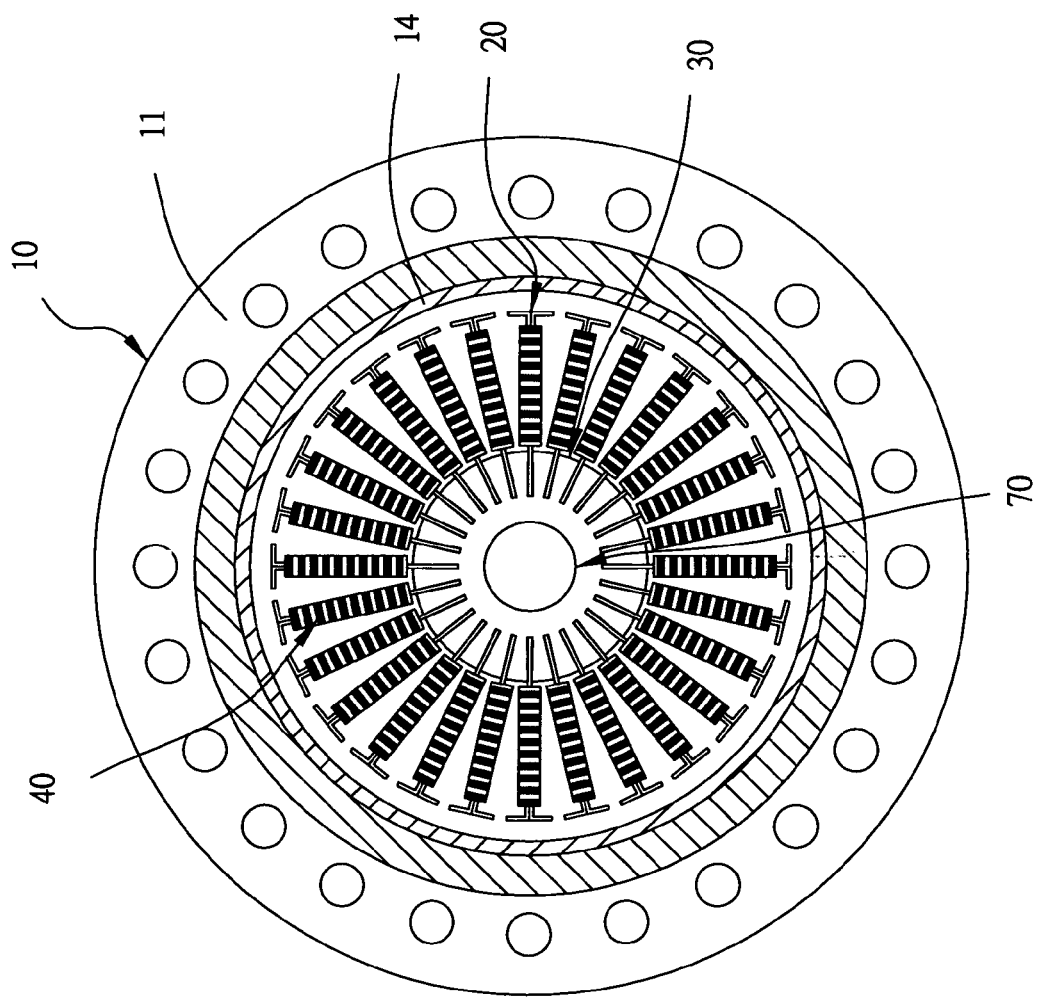
FIG. 4 is another side cross-sectional view of the first embodiment of a small generator in the present invention.

A first embodiment of a small generator with collective multiple poles is applied to a wheel hub of a bicycle in the present invention, as shown in FIG. 1, and the wheel hub includes a hub shell 10, a hub shaft 70 passing through the hub shell 10 and a bearing 13 respectively fitted on the hub shaft 70 at two opposite sides of the hub shell 10, and many spokes 1 are fixed with the hub shell 10, with the front or rear wheel fork 2 fixed on two ends of the hub shaft 70. When the hub shell 10 is rotated by the wheel spokes 1, the small generator may generate electric power to be supplied to a front lamp and a tail lamp on the bicycle.

The small generator includes an outer rotor and an inner stator as main components. The outer rotor is a cylindrical member and the hub shell 10 is used as the cylindrical member in this embodiment, and the inner stator is composed of multiple magnetic poles 20, an annular iron core 30, multiple sheet-shaped coils 40, a fixing ring 50, a connecting PC board 60 and the hub shaft 70.

The hub shell 10 consists of a first body 11 and a second body 12, and the first body 11 has an interior hollow 111 and the second body 12 fixed in an opening of the interior hollow 111 of the first body 11. Then the first and the second body 11 and 12 are fixed on the hub shaft 70 by means of two bearings 13 so that the hub shell 10 may rotate freely with the hub shaft 70 as a pivot. The first body 11 further has a projecting edge 112 respectively at two opposite sides of the outer circumference for the spokes 1 of the front or the rear wheel of a bicycle to fix with, so the hub shell 10 may be rotated by the spokes 1. Further, a magnet 14 is provided in the diameter direction in the interior hollow 111 of the first body 11, and the magnet 14 in this embodiment is composed of four permanent magnets, with the N poles and the S poles alternately positioned equidistantly to form a magnetic field and to have 28 magnetic poles.

The multiple magnetic poles 20 is arranged equidistantly around the axle of the hub shell 10 so that each magnetic pole 20 may face to each pole of the magnet 14 located in the hub shell 10. In this embodiment each magnetic pole 20 has a T-shaped cross-section, made up of two L-shaped pieces 21 overlapped on each other, and further has a notch 22 respectively in two opposite axial sides.

The annular iron core 30 is made of multiple annular iron sheets 31 respectively with a center hole 311 closely superposed on one another, having multiple notches 312 equidistantly spaced apart for each magnetic poles 20 to fit tightly therein so that each magnetic pole 20 may be connected by the magnetic circuits of the annular iron core 30 so as to let magnetic lines of force to pass through.

Figure 6:
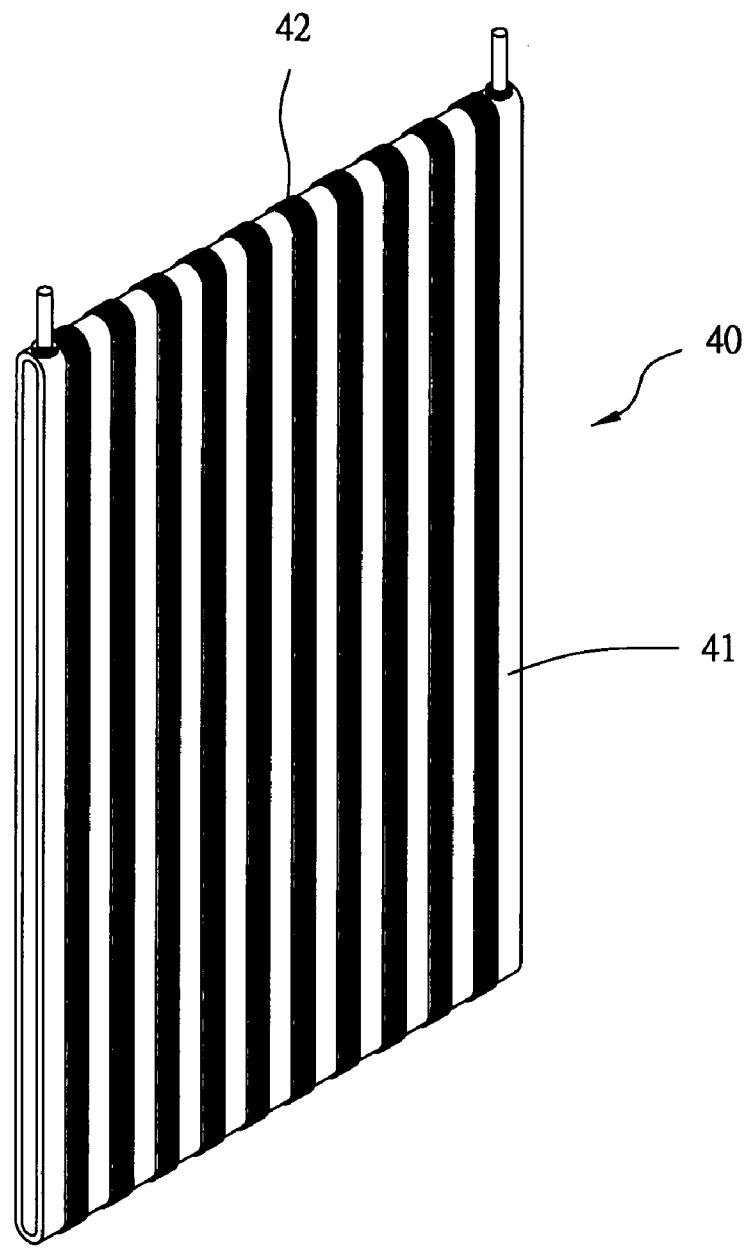
FIG. 6 is an enlarged perspective view of a sheet-shaped coil in the present invention.

The sheet-shaped coils 40 in this embodiment, as shown in FIG. 6, is a coil circuit 42 printed on a film circuit board 41 by means of a mechanical process, possible to be fitted on each magnetic pole 20. But the sheet-shaped coils 40 are also possible to be made with magnetic wires wound by a machine.

The fixing ring 50 has a center hole 51 and an annular projecting edge 52 extending inward from the outer circumference to fit in each notch 22 of the magnetic pole 20 so as to position each magnetic pole 20 synchronously and accurately.

The connecting PC board 60 is shaped circular, located at one side of the multiple magnetic poles 20, having a center hole 61 and its outer circumference for two ends of the wires of each coil 40 to be connected thereon for transmitting electric power generated on the sheet-shaped coils 40.

The hub shaft 70 penetrates the center of the first and the second body 11 and 12, and also passes the center hole 311 of the iron core 30, the center hole 51 of the fixing ring 50 and the center hole 61 of the connecting PC board 60, having a projecting annular member 71 for the outer wall of the fixing ring 50 to rest against, and the right end screwing with a nut 72 to fix tightly the fixing ring 50 with the hub shaft 70.

Thus the magnetic poles 20, the annular iron core 30, the sheet-shaped coils 40, the fixing ring 50 and the connecting PC board 60 constituting the stator are stably fixed on the hub shaft 70.

In using, FIG. 1 shows the first preferred embodiment of the small generator with collective multiple poles fixed with a wheel hub of a bicycle. When a user steps and rotates the pedals of the bicycle to cause the spokes 1 of the wheel rotate, the magnet 14 of the rotor in the hub shell 10 is accordingly rotated around the stator, and magnetic lines of force may be generated between the magnet 14 and each magnetic poles 20 of the annular iron core 30 so that alternate magnetic lines of force of diametrical directions may be generated on the relative two magnet poles 20 connected by the magnetic circuit of the annular iron core 30. Therefore, the sheet-shaped coils 40 on the magnetic poles 20 generate alternate electric current (AC), which can be supplied to electrical appliances on the bicycle.

Figure 5A:
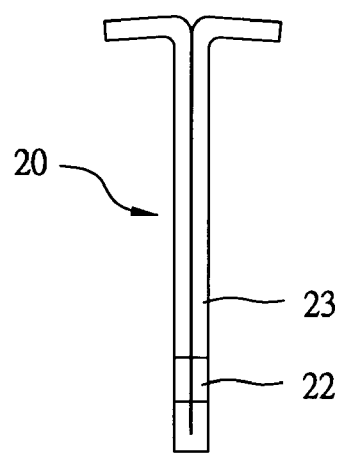
FIG. 5a is a cross-sectional view of the first embodiment of a magnetic pole in the present invention.
Figure 5B:
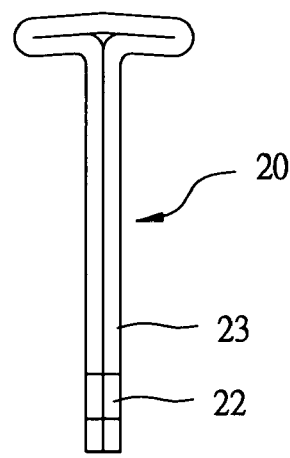
FIG. 5b is a cross-sectional view of a second embodiment of a magnetic pole in the present invention.
Figure 5C:
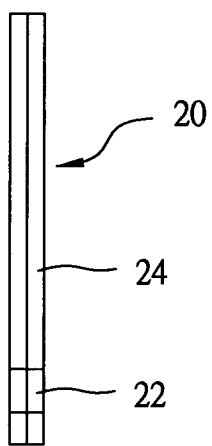
FIG. 5c is a cross-sectional view of a third embodiment of a magnetic pole in the present invention.
Figure 5D:
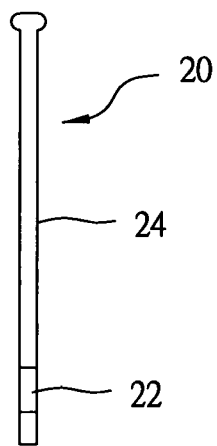
FIG. 5d is a cross-sectional view of a fourth embodiment of a magnetic pole in the present invention.

Next, FIGS. 5a and 5b show the first embodiment and the second embodiment of each magnetic pole 20, having a T-shaped cross-section and made of a piece 23 bent, and the two ends of the piece 23 may be located at the upper side or the lower side. FIGS. 5c and 5d show the third and the fourth embodiment of each magnetic pole 20, having an I-shaped cross-section and made of two pieces 24 combined together or a single piece 24.

Figure 7:
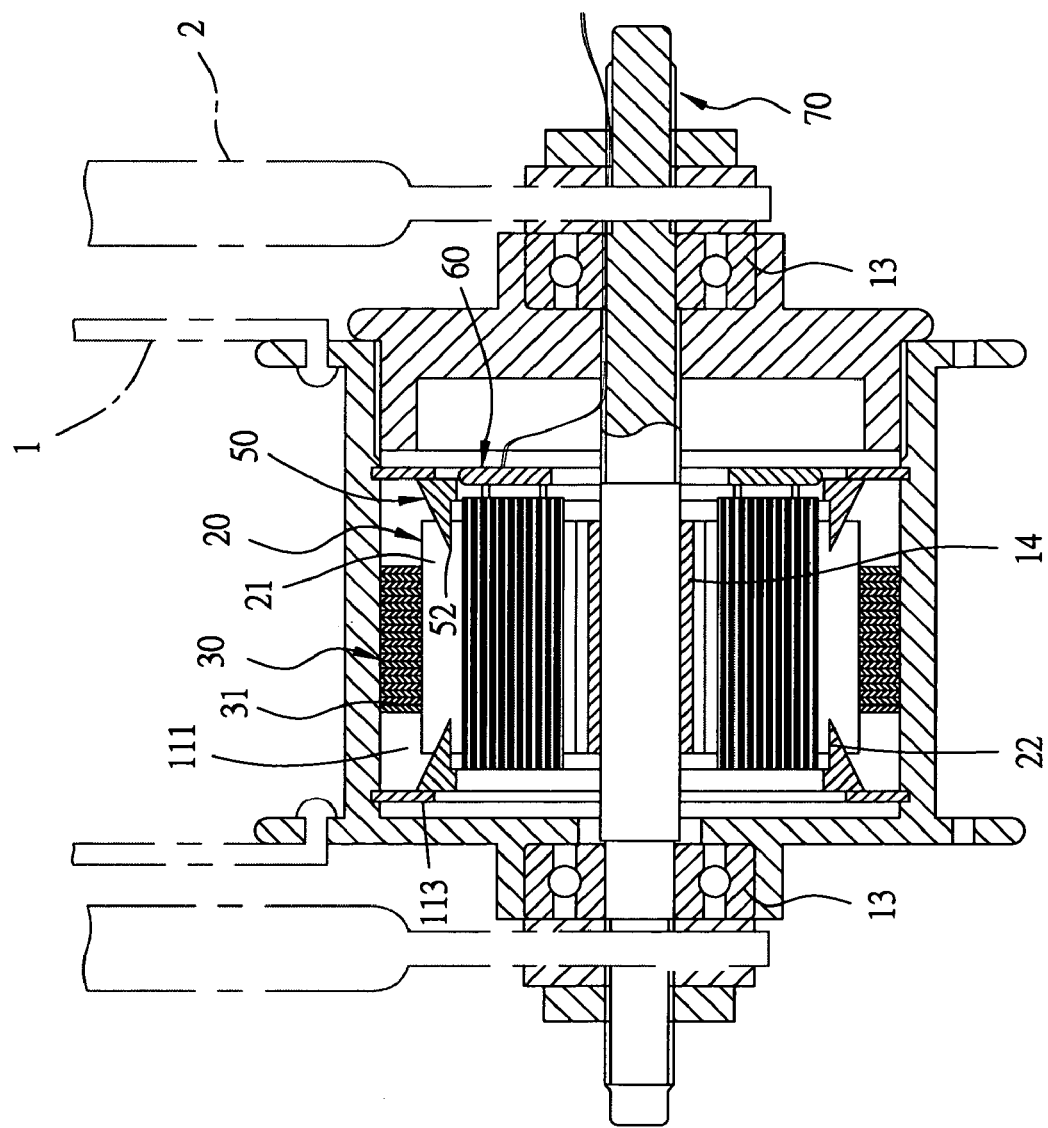
FIG. 7 is a cross-sectional view of a second embodiment of a small generator with collective multiple poles applied to a wheel hub of a bicycle in the present invention.
Figure 8:
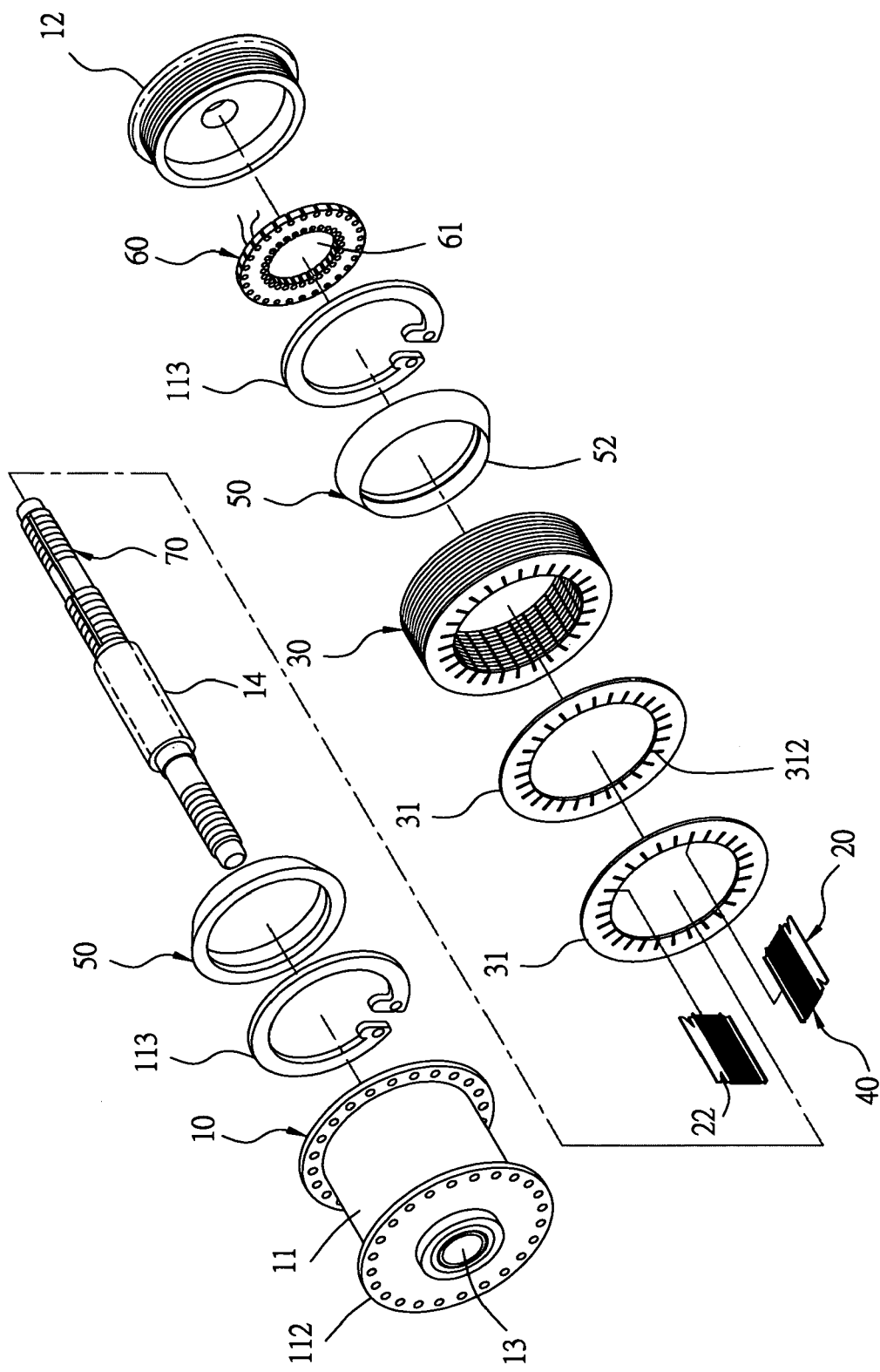
FIG. 8 is a partial exploded perspective view of the second embodiment of a small generator in the present invention.
Figure 9:
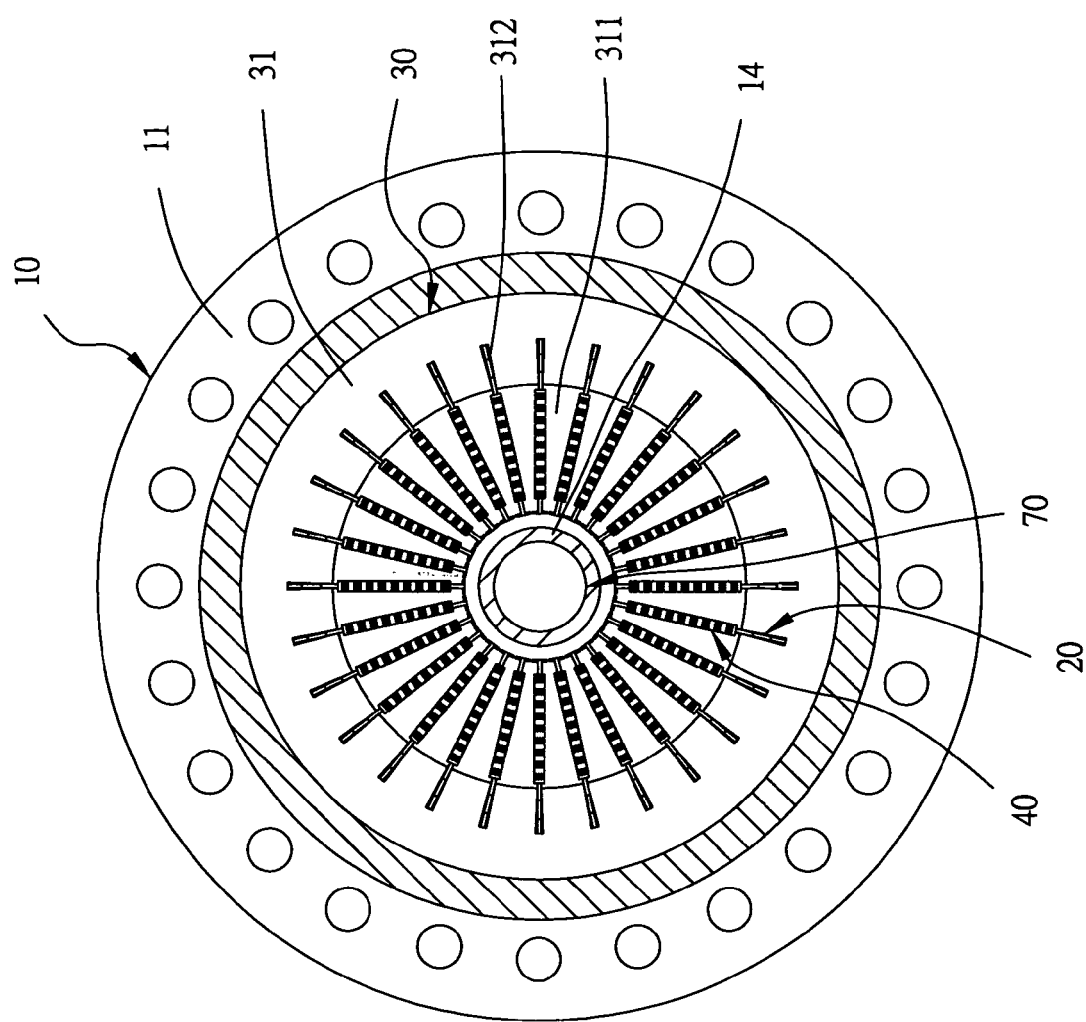
FIG. 9 is a side cross-sectional view of the second embodiment of a small generator in the present invention; and, FIG. 10 is a side cross-sectional view of a third embodiment of a small generator with collective multiple poles applied to a wheel hub of a bicycle in the present invention.

Next, FIGS. 7, 8 and 9 show a second preferred embodiment of a small generator with collective multiple poles in the invention, and the important differences from the first embodiment are the annular iron core 30 arranged in the interior hollow 111 of the first body 11 of the hub shell 10, the multiple magnetic poles 20 fitted in the notches 31 of the inner annular surface of the iron core 30, two fixing rings 50 respectively having an annular projection 52 fitting stably in the notches 22 of the magnetic poles 20, two C-shaped locking washers 113 fixed at two inner sides of the first body 11 to lock the fixing rings 50 in place. Then the magnet 14 is fixed around the hub shaft 70 to face to each magnetic pole 20 on the inner annular surface of the annular iron core 30. Thus the annular iron core 30, the multiple magnetic poles 20 and the sheet-shaped coils 40 fitted on the hub shell 10 constitute a rotor, and the magnet 14 and the hub shaft 70 together constitute the stator. So when the rotor rotates around the stator, the magnetic poles 20 receive the magnetic lines of force from the magnet 14 so that alternate magnetic lines of force may be generated on the magnetic poles 20 and the sheet-shaped coils 40 may generate alternate electric current (AC) to be used by electronic appliances on the bicycle.

Figure 10:
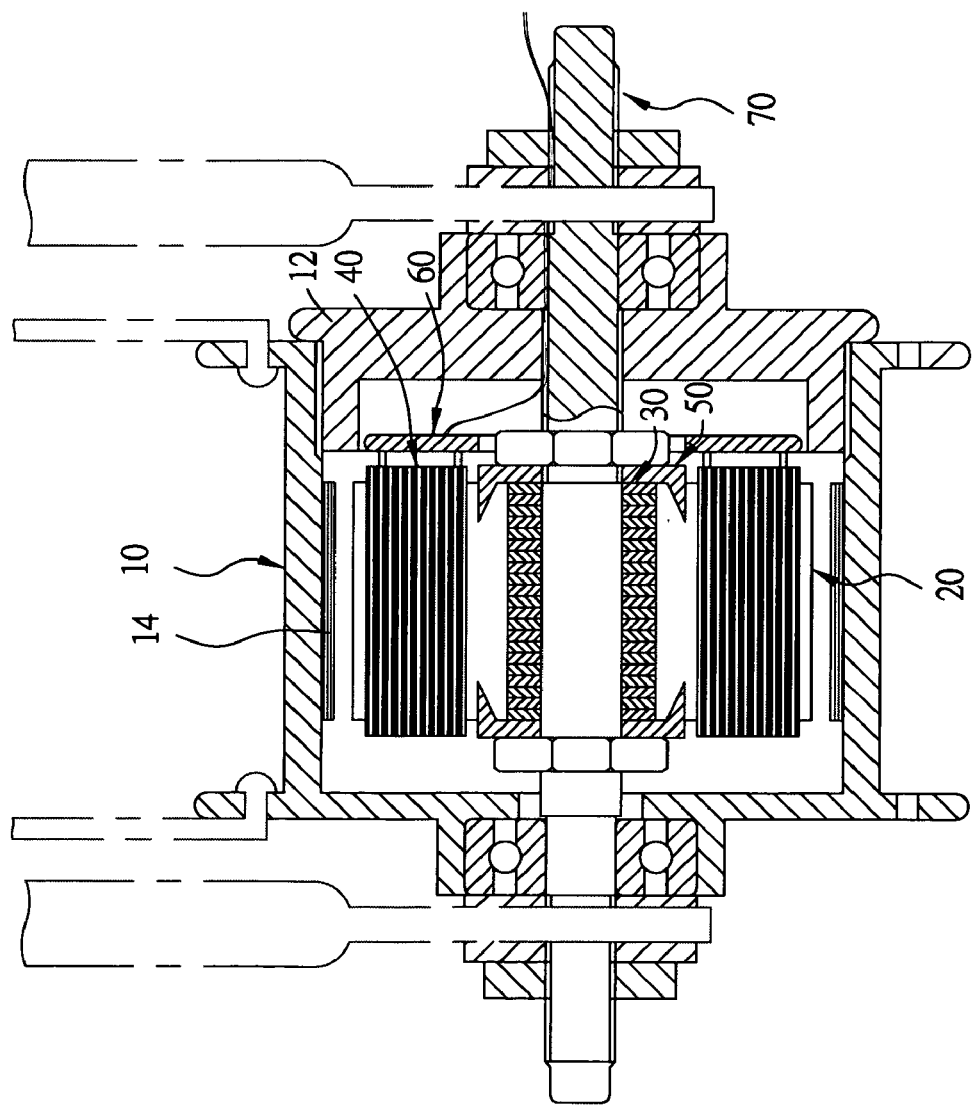

A second embodiment of a magnet 14 in the invention is shown in FIG. 10, and an electromagnet is used instead of a permanent magnet used in the embodiments described above. Therefore, when the electromagnet 14 is powered, it turns temporarily in a magnet to function as the permanent magnet used in the magnet 14. Then when the electromagnet powered 14 rotates around the stator, the magnetic poles 20 receive the magnetic lines of force generated by the electromagnet 14 powered, and the sheet-shaped coils 40 on the magnetic poles 20 may generate alternate current (AC). If the electromagnet 14 is turned off the power, between the electromagnet 14 and the sheet-shaped coils 40 may not occur magnetization. So even if the electromagnet not powered (or the rotor) should be rotated, the magnetic poles 20 cannot receive magnetic lines of force from the rotor, and the user riding on the bicycle may not need to step the pedals with much force to counter the resistant force of the magnetism of the generator.

Thus, the invention has the following advantages, as can be understood from the foresaid description.

1. The sheet-shaped coils 40 can be in advance made by mechanical process by winding wires or printing a coil circuit 42 on a film boars 41, needing no manual work, so they are assembled with fastness and with less cost.

2. The sheet-shaped coils 40 are combined with the magnetic poles 20, with magnetic wires required may be reduced a lot, cutting down effectively its cost.

3. The generator in the invention has been used practically and tested, and found to generate comparatively high power to have good efficiency.

4. The rotor and the stator in this generator are exchangeable in their location, possible to have various structures optional.

5. The magnet 14 can be a permanent magnet or an electromagnet, and if the electromagnet is used, the electromagnet 14 cut off electricity cannot induce magnetization to the sheet-shaped coils of the stator, ensuring a user riding on the bicycle not to receive interference on the leg force for pedaling from the magnetic force produced by the generator.

While the preferred embodiments of the invention have been described above, it will be recognized and understood that various modifications may be made therein and the appended claims are intended to cover all such modifications that may fall within the spirit and scope of the invention.

What is claimed is:

1. A generator in a wheel of a bicycle with collective multiple magnetic poles comprising:
   a magnet;
   multiple magnetic poles arranged in an annular shape, and facing to said magnet with a gap;

an annular iron core having an outer circumference combined with said multiple magnetic poles spaced apart equidistantly, said annular iron core forming magnet circuits for said magnetic poles so as to let magnetic lines of force to pass through;

multiple sheet-shaped coils respectively combined on a respective one of said magnetic poles; and a cylindrical body, said magnet is positioned in said cylindrical body, said magnetic poles are inserted stably and spaced apart equidistantly in an outer circumference of said annular iron core and facing to said magnet, wherein said cylindrical body and said magnet together constitute an outer rotor, and said multiple magnetic poles, said annular iron core and said multiple sheet-shaped coils constitute an inner stator, and said stator is positioned in said cylindrical body and fixed on a hub shaft of the wheel of the bicycle extending through said cylindrical body, wherein said inner stator is fixed on said hub shaft of the wheel of the bicycle, and said outer rotor is connected with a rotating component of said wheel, wherein said annular iron core is made of multiple annular iron sheets superposed with one another, wherein said magnetic poles respectively have a notch respectively in two axial sides near said annular iron core for a fixing ring to fit therein stably, wherein said sheet-shaped coils respectively have two wire ends connected to a connecting PC board positioned at one side of each of said magnetic poles.

2. The generator as claimed in claim 1, wherein each of said magnetic poles has an I-shaped cross-section.

3. The generator as claimed in claim 1, wherein each of said magnetic poles has a T-shaped cross-section.

4. The generator as claimed in claim 3, wherein each of said magnetic poles with said T-shaped cross-section is made of two L-shaped pieces combined together.

5. The generator as claimed in claim 3, wherein each of said magnetic poles with said T-shaped cross-section is respectively made of a piece bent.

6. The generator as claimed in claim 1, wherein each of said sheet-shaped coils is made of a film board printed thereon with a coil circuit functioning as a coil.

7. The generator as claimed in claim 1, wherein said magnet is a permanent magnet.

* * * * *